(12) United States Patent
Atshan (10) Patent No.: US 11,772,857 B2
(45) Date of Patent: Oct. 3, 2023

(54) FOOD STORAGE CONTAINER HAVING ATTACHED LID

(71) Applicant: Beisanne Atshan, Oak Forest, IL (US)

(72) Inventor: Beisanne Atshan, Oak Forest, IL (US)

(\*) Notice: Subject to any disclaimer, the term of this patent is extended or adjusted under 35 U.S.C. 154(b) by 0 days.

(21) Appl. No.: 17/575,569

(22) Filed: Jan. 13, 2022

(65) Prior Publication Data

US 2022/0219867 A1    Jul. 14, 2022

Related U.S. Application Data

(60) Provisional application No. 63/137,558, filed on Jan. 14, 2021.

(51) Int. Cl.
*B65D 43/22* (2006.01)
*A47J 47/10* (2006.01)
*B65D 43/16* (2006.01)

(52) U.S. Cl.
CPC ............. *B65D 43/22* (2013.01); *A47J 47/10* (2013.01); *B65D 43/166* (2013.01)

(58) Field of Classification Search
CPC .. B65D 43/22; B65D 43/166; B65D 47/0842; B65D 75/5877; A47J 47/10
See application file for complete search history.

(56) References Cited

U.S. PATENT DOCUMENTS

| 10,392,165 B2* | 8/2019 | DeCarlo ............. B65D 43/169 |
| 11,046,511 B1* | 6/2021 | Cohen .................... B65D 43/22 |
| 11,091,299 B1* | 8/2021 | Nelson ................ B65D 85/345 |
| 2009/0008284 A1* | 1/2009 | Lown .................... B65D 45/20 |
| | | 220/788 |
| 2020/0102126 A1* | 4/2020 | Guerdrum .......... B65D 81/3813 |
| 2020/0399028 A1* | 12/2020 | Bullock ............. B65D 51/1611 |
| 2021/0016922 A1* | 1/2021 | Leng .................... B65D 43/165 |

\* cited by examiner

*Primary Examiner* — Shawn M Braden
(74) *Attorney, Agent, or Firm* — DLA PIPER LLP (US)

(57) ABSTRACT

Disclosed herein is a food container having a durable storage compartment that is fixed to the lid by a hinge and a plurality of connectors. The food container may be formed from borosilicate glass or another durable material that may be reused and will not deteriorate in the microwave or when exposed to extreme hot and or cold temperatures. The lid may be secured to the storage compartment so that the lid will not get misplaced when the food container is washed or otherwise not in use.

14 Claims, 9 Drawing Sheets

FOOD STORAGE CONTAINER HAVING ATTACHED LID

CROSS REFERENCE TO RELATED APPLICATIONS

This application claims the benefit of U.S. Provisional Application Ser. No. 63/137,558 filed Jan. 14, 2021, the entire contents of which are incorporated by reference.

TECHNICAL FIELD

This application relates to the field of storage containers. More specifically, this application relates to reusable, non-toxic food storage containers having a permanently attached re-closable lid.

BACKGROUND

Currently, most food is stored in single use plastic or paper containers that are discarded after use. If disposed of properly, these food containers wind up in landfills where they take decades if not centuries to degrade. Many disposable food containers, however, do not make into a trash can and are often discarded in the natural environment where the food containers endanger wildlife and pollute water, forests, and other natural resources. Despite their prevalence, many disposable food containers are unsafe to use. The harmful chemicals included in the container material may seep into the food and effect the health of people consuming the food. Many common reusable containers are also unsafe to use, especially in the microwave. Reusable food containers are typically made of soft plastics, therefore, when the reusable containers are exposed to microwaves, the soft plastic materials become unstable and melt or degrade. The degraded material can then contaminate the food stored in the container and prevent the reusable container from being used again.

Moreover, reusable food containers commonly have a detachable lid that is separate from the storage compartment of the food container. These detachable lids are small and often lost, misplaced, or otherwise separated from the other pieces of the food container. Additionally, there is no standard size for food storage containers so additional lids that fit the container's storage compartment cannot be easily found or purchased. Without a lid, the reusable container is not usable and must be discarded. Similar to disposable food containers, incomplete reusable containers make up a large portion of waste in landfills and frequently end up as pollution in the natural environment. Therefore, there is a need for a reusable food container that is made out of durable, non-toxic material that will not degrade under extreme hot or extreme cold. It is also desirable to have a reusable food container that has a lid attached to the storage compartment of the container to ensure the pieces of the food container are never separated.

SUMMARY

In one aspect disclosed herein are food containers comprising a storage compartment including a base portion and one or more side portions that extend from the base portion to a rim that runs along a perimeter of a top side of the storage compartment; a lid that fits over the top side of the storage area, the lid including a plurality of locking elements that are moveable relative to the lid, the locking elements configured to secure the lid to the storage compartment; and a hinge connected to the lid and fixed to the storage compartment by one or more connectors, the hinge formed from a durable, flexible material and configured to join the lid to the storage compartment and allow a bottom side of the lid to fold over the top side of the storage compartment.

In one aspect, the storage area is formed from a durable, non-toxic borosilicate glass material. In one aspect, the locking elements include an "L shaped" piece of material that extends down from an exterior edge of the lid toward an interior side of the lid. In one aspect, the "L shaped" piece of material is hinged at an attachment point that joins the locking elements to the lid, wherein the locking elements pivot at the attachment point to arrange the food container in a locked position and in an unlocked position. In one aspect, "L shaped" piece of material includes a horizontal rectangle that runs parallel to the interior side of the lid and a vertical rectangle that runs perpendicular to the interior side of the lid. In one aspect, the locked position includes the "L shaped" piece of material wrapped around the rim of the storage container and a horizontal rectangle of the "L shaped" piece of material is pushed into contact with a surface area on a bottom side of the rim. In one aspect, the unlocked position includes the "L shaped" piece of material lifted away from the rim of the storage container with the horizontal rectangle of the "L shaped" piece of material positioned away from a surface area on a bottom side of the rim.

In one aspect, the side portion storage slopes outwardly along a side portion edge that extends from the base portion to the rim so that a perimeter of the rim is greater than a perimeter of the base portion. In one aspect, an inner surface of the lid includes a groove along a perimeter of the inner surface.

In one aspect, the food container further comprises a ring that fits into the groove, wherein the ring is formed from an elastomeric material. In one aspect, the ring is configured to compresses against the rim to form an airtight and moisture tight seal when the lid is closed over the top side of the storage compartment and the locking elements are arranged in a locked position. In one aspect, the ring is removable from the groove and wherein the ring is formed from a durable silicone material. In one aspect, the connectors include a flexible material having an hourglass shape, the hour glass shape including a first head joined by a middle portion to a second head, wherein the first and second heads have a greater circumference relative to the middle portion. In one aspect, the first head of the connectors is inserted into a hole in the side portion of the storage compartment and the second head of the connectors is inserted into a hole in the hinge to connect the lid to storage compartment.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Food Storage Device Hardware Overview

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known components have not been described in detail so as not to unnecessarily obscure aspects of the embodiments of the invention.

Figure 1:
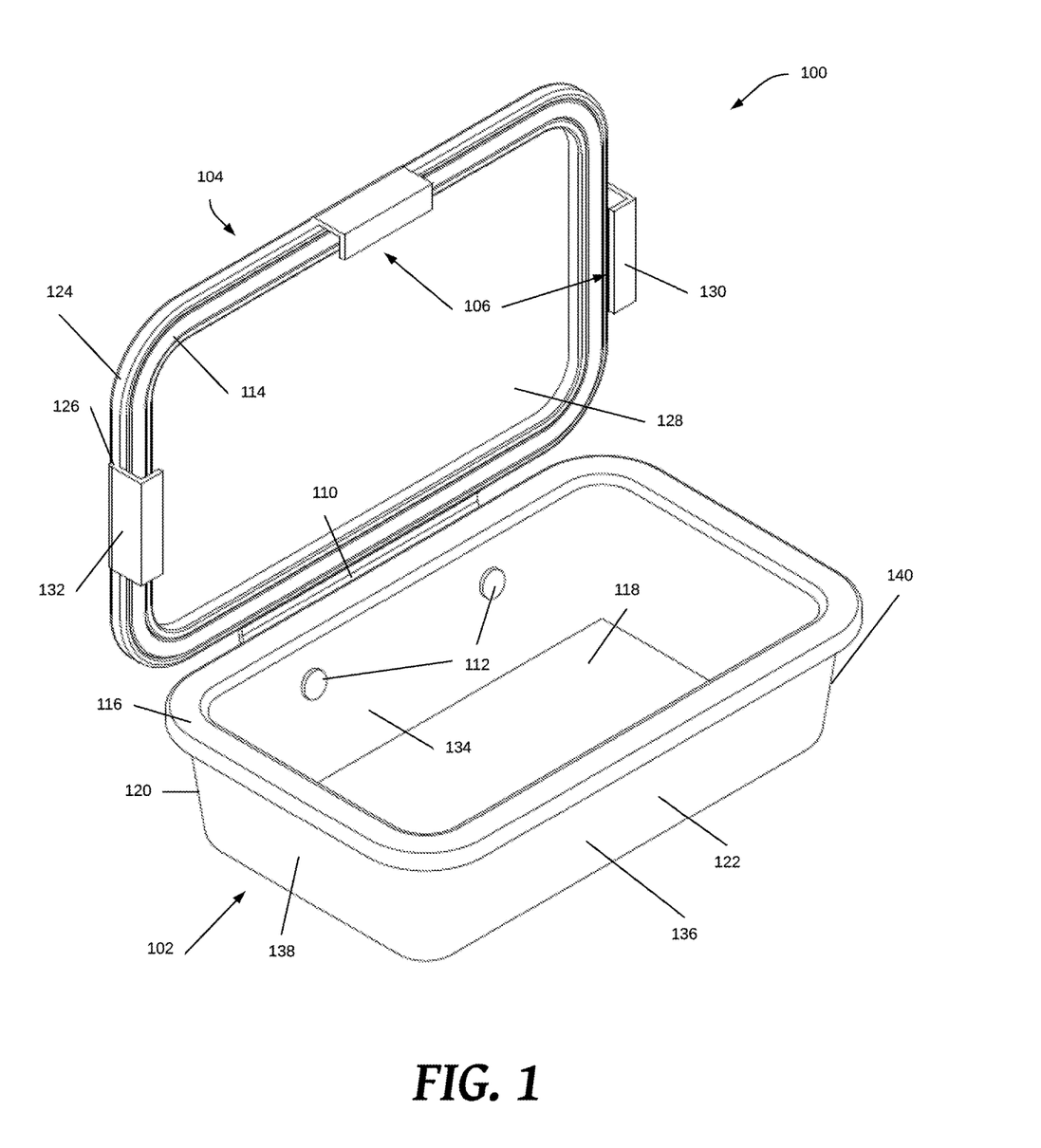
FIG. 1 is a perspective view of an exemplary food storage container, according to embodiments of the disclosure.

FIGS. 1-7 illustrate different perspectives of an exemplary food container 100. FIG. 1 illustrates a perspective view of the exemplary food container 100. As shown, the food container 100 includes a storage compartment 102 and a lid 104. The storage compartment 102 may include a base portion 118 and a side portion 122 that extends from the base portion 118 to the rim 116 of the storage compartment 102. The side portion 122 may slope outwardly along the side portion edge 120 of the storage compartment 102 from the base portion 118 to the rim 116. The sloped side portion edge 120 allows the storage compartment to be wider at the rim 116 relative to the base portion 118. For example, the side portion 122 may slope outwardly along the side portion edge 120 that extends from the base portion 118 to the rim 116 so that the perimeter of the rim 116 is greater than the inner perimeter and or outer perimeter of the base portion 118. In various embodiments, the side portion 122 may slope outwardly at an angle between 5 and 10 degrees. The storage compartment 102 may have a width running from a left side 134 of the storage compartment 102 to the right side 136 of the storage compartment that measures between 4 inches (in) and 6 in. The storage compartment 102 may have a length running from a first end 138 of the storage compartment 102 to a second end 140 of the storage compartment that measures between 6 in and 8 in. The storage compartment may have a depth running from the base portion 118 to the rim 116 that measures between 2.0 in and 3.5 in. The side portion 122 of the storage compartment may have a thickness measuring between 0.125 in and 3.75 in various embodiments, and between 0.0625 in and 0.125 in other embodiments.

The storage compartment 102 may be made out of a durable, non-toxic material, for example, borosilicate glass. The storage compartment 102 may also be made out of a Bisphenol A (BPA) free plastic, for example, Tritan. The material of the storage compartment 102 allows the food container 100 to be reused and safely washed. The material of the storage compartment 102 also ensures the food container 100 will not degrade over time or when the storage compartment 102 is exposed to extreme cold conditions, for example, storage in a freezer, and or extreme hot conditions, for example, in a microwave, conventional oven, or other heating element. For example, the storage compartment 102 may be made of borosilicate 3.3. glass which has a low thermal expansion and therefore is a safe material that is safe to use even at high heat. The material of the storage compartment 102 may also be a good thermal insulator to allow the storage compartment to retain heat and or cold for a long period of time relative to thermally conductive materials.

The storage compartment 102 may also include a rim 116 around the top side of the storage compartment 102 opposite the base portion 118. The rim 116 may extend out from the top side of the storage compartment to provide a surface area to seal, grip, and or hold the food container without touching the walls and or the base of the storage compartment 102. The rim 116 may have a width between 0.25 in and 0.375 in. The surface area on the bottom side of the rim 116 may also allow the food container 100 to be carried safely without touching the side portion 122 and or base portion 118 of the storage compartment 102 which may be hot from direct contact with a heating element. The surface area of the rim 116 may also help seal the lid 104 over the top side of the storage compartment 102.

The lid 104 may include one or more locking elements 106 that secure the lid 104 to the storage compartment 102. The locking elements 106 may include an "L shaped" piece of material that extends down from an exterior edge 124 of the lid 104 toward the interior side 128 of the lid 104. The "L shaped" piece of material may include a horizontal rectangle 130 that runs parallel to an interior surface 128 of the lid 104 and a vertical rectangle 132 that runs perpendicular to the interior surface 128 of the lid. The locking elements 106 may be hinged at the attachment point 126 with the lid 104 so that the locking elements 106 are moveable relative to the lid 104, such hinge may be a living hinge made of the same material as the locking elements 106. The locking elements 106 may pivot at the attachment point to wrap around the rim 116 and attach to the surface area of the rim 116 to secure the lid 104 to the storage compartment 102. In particular, the lid 104 may be secured to the storage compartment 102 when the food container 100 is in locked position and the lid 104 may be moveable relative to the storage compartment 102 when the food container 100 is in an unlocked position. When the food container is in a locked position the "L shaped" piece of material included in the locking elements 106 wraps around the rim 116 of the storage compartment 102 and the horizontal rectangle 130 of the "L shaped" piece of material is pushed into contact with a surface area on a bottom side of the rim 116. When the food container 100 is in an unlocked position the "L shaped" piece of material included in the locking elements 106 is lifted away from the rim 116 of the storage compartment 102 with the horizontal rectangle 130 of the "L shaped" piece of material positioned away from the surface area on the bottom side of the rim 116.

The locking elements 106 may be made out of a hard plastic or silicone material so that they are durable and easy to maneuver to lock and unlock the lid 104. For example, the locking elements 106 may be made out of a hard plastic material that snaps into place over the rim 116 and in contact with the surface area when pushed into a locked position using a friction fit and releases away from the rim 116 when lifted into an unlocked position. The locking elements 106 may have a thickness that measures between 0.100 in and 0.150 in. In various embodiments, the thickness of the locking elements may be 0.125 in. The lid 104 may be made of a durable, non-toxic material, for example, borosilicate glass, Tritan, or other BPA free plastic and the like so that the lid 104 is food safe, reusable, and washable. The lid 104 may have a thickness that measures between 0.100 in and 0.150 in. In various embodiments, the thickness of the lid 104 may be 0.125 in. The hinge that connects the locking elements 106 and the lid 104 at the attachment point 126 may be made of a silicone and or flexible plastic material so that the locking elements 106 may pivot on the lid 104. The hinge may have a thickness that measures between 0.060 in and 0.130 in. In various embodiments, the hinge may have a thickness that measures between 0.065 in and 0.125 in. In various embodiments, the thickness of the hinge may be 0.125 in. The materials used to form the locking elements 106, lid 104, and hinge may not degrade overtime or when exposed to extreme cold or extreme heat conditions so that the food container 100 may be sealed when used to freeze and or heat food.

An interior surface of the lid 104 may include a groove. For example, the groove may be positioned along the outer perimeter of the lid 104 just to the inside of the exterior edge 124 of the lid 104. The groove may run along the entire perimeter of the lid 104 and or along a portion of the lid 104. The groove may have a width that measures between 0.20 in and 0.50 in and a depth that measures between 0.20 in and 0.50 in. In various embodiments, the width of the groove may be 0.25 in and the depth of the groove may be 0.25 in. A ring 114 may be placed inside the groove. To allow the ring 114 to fit snuggly inside the groove, the ring 114 may have a width that measures between 0.150 in and 0.400 in. In various embodiments, the thickness of the ring 114 may be 0.200 in. The ring 114 may be formed from a food grade silicon, rubber, or any other elastomeric material and may have a round and or rectangular cross section. The ring 114 may extend out from the interior surface of the lid 104 so that the ring 114 is compressed when the lid 104 is over the rim 116 and the locking elements 106 are locked into a locked position. In various embodiments, the ring 114 may have a height that measures between 0.300 in and 0.500 in. In various embodiments, the ring 114 may have a height that measures between 0.3125 in and 0.375 in. The height of the ring 114 may be greater than the depth of the groove so that the ring 114 extends out from the grove. In various embodiments, the ring 114 may extend out from by container a distance between 0.125 in and 0.25 in. In various embodiments, the height of the ring may be 0.375 in so that the ring extends out from the groove (e.g., a groove having a depth of 0.25 in) a distance measuring 0.125 in. Once compressed, the ring 114 seals the inside of the food container 100 to prevent air and moisture from entering and or exiting the food container 100. The seal provided by ring 114 keeps food items stored in the storage compartment 102 dry and fresh for an extended period of time (i.e., hours, days, weeks, or any other period of time having a duration greater than 1 hour) and prevents food from going stale inside the food container 100. The seal provided by the ring 114 also prevents liquids stored in the storage compartment 102 from leaving the food container 100 and making a mess.

Figure 7:
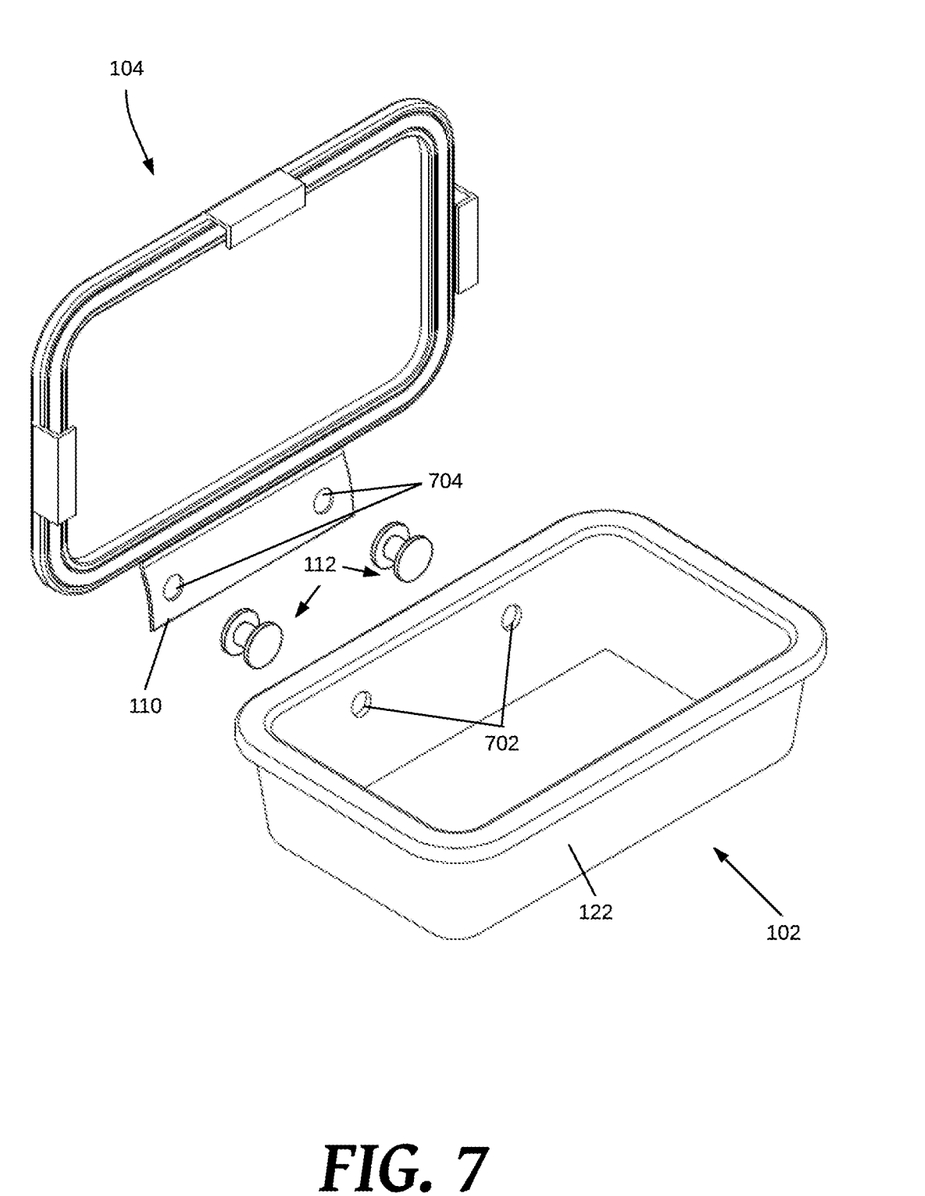
FIG. 7 illustrates an exploded view of an exemplary food storage container, according to embodiments of the disclosure.

FIG. 7 illustrates an exploded view of the food storage container. As shown in FIG. 7, the food storage container may be assembled using two connectors 112 and a hinge 110 that attach the lid 104 to the storage compartment 102. The two connectors 112 may be inserted into one or more holes 702 cut into one or more sides of the storage compartment 102 and one or more openings 704 in the hinge 110. The holes 702 for inserting the connectors 112 may be cut in a middle portion of a side of the storage compartment 102 or another other location on the side portion 122. The openings 704 for inserting the connectors 112 may be cut in a middle portion of the hinge 110 or any other location on the hinge 110 so that the openings 704 align with the holes 702. In one embodiment, the holes 702 may be cut between 1.3 in and 2.4 in up from the bottom of the side portion 122 (i.e., approximately two thirds of the height of the side portion 122) and between 1.5 in to and 2.7 in to the right and or left from the lateral center point of the side portion 122 (i.e., approximately one forth to one third of the total length of the side portion 122 away from the lateral center point of the side portion 122). The holes 702 and openings 704 may be spaced between 0.125 in and 1.000 in apart. The holes 702 and openings 704 may have a diameter that measures between 0.25 in and 0.5 in so that the circumference of the holes 702 and openings 704 may be between 0.785 in and 1.58 in. Although FIGS. 1-5 and 7 illustrate only two holes 702, two openings 704, and two connectors 112, any number of holes 702, openings 704, and or connectors 112 may be used to secure the lid 104 to the storage compartment 102.

The holes 702 may be cut and or bored into the side of the storage compartment 102 using a carbide bit to avoid cranking or breaking the storage compartment 102. Using the carbide bit, the holes 702 may be bored into the storage compartment 102 by first drilling at a low revolutions per minute (rpm) (i.e., 30 rpm to 100 rpm) to create a dimple in the side of the storage compartment 102. The carbide bit may then be placed in the dimple and spun at an rpm of between 350 rpm to 500 rpm to bore the holes 702 in the storage compartment 102. Some oil may also be added to the area of the storage compartment 102 in contact with the carbide bit to provide lubrication for the bit and reduce the tendency to chip the side of the storage compartment 102. The circumference of the holes 702 may then be ground or otherwise machined to smooth any sharp edges. Alternatively, the hinge 110 and storage compartment 102 may be manufactured with the openings 704 and holes 702 respectively already in place to reduce the rate of material failure during manufacturing. In such embodiments, the holes 702 may be formed during the casting process of the storage compartment 102 and not cut with a drill. The hinge 110 may be manufactured with the openings 704 already in place.

To attach the lid 104 to the storage compartment 102, one or more connectors 112 may be threaded through each hole 702 cut into the side of the storage compartment. The connectors 112 may then be attached to the hinge 110 fixed to the lid 104. Once attached to the connectors 112, the hinge 110 provides a joint for the lid 104 to pivot on and fold over the top side of the storage compartment 102. To attach the hinge 110 to the connectors 112, the connectors 112 may be threaded through the one or more openings 704 in the hinge 110. The hinge 110 may also be fused to the connectors 112 or otherwise joined to the connectors 112 (e.g. using an adhesive and or heat molding). In one embodiment, the hinge 110 may be detached from the connectors 112 so that the lid 104 may be selectively detachable from the storage compartment 102. For example, the lid 104 may be detached from the storage compartment 102 to facilitate cleaning the food container 100. Removing the lid 104 from the storage compartment 102 may also allow the storage compartment 102 to function as a serving dish that may be used to extract portions of food during a meal, for example, a buffet style meal.

Other configurations of the lid 104 may include a lid 104 that has a lip so that the lid 104 remains attached to the storage compartment at all times and can fold away from the storage compartment 102 without the need for the holes 702 or hinge 110. This configuration would require the lid 104 to have four locking elements instead of the three locking elements shown in FIGS. 1-7. The additional locking element ensures the lid 104 seals evenly around the perimeter of the storage compartment 102. Another configuration of the lid 104 may include a second silicone ring that wraps around the perimeter of the storage compartment 102 just below the lip to cover the locking elements and hold them in place to seal and secure the lid 104 over the storage compartment 102. This configuration may make the lid easily removable for cleaning and would not include holes 702 or other permanent alterations to the glass material of the storage compartment 102.

The connectors 112 and hinge 110 may be made out of a soft flexible material, for example, food grade silicon or another elastomeric material. The material used to form the connectors 112 and the hinge 110 may also be durable, non-toxic and thermal insulators to allow the food container 100 to retain heat for a long period of time once hot and or remain old for a long period of time once chilled. The hinge 110 may be connected to the food container by inserting one or more of the connectors 112 through at least one hole 702 in the side of the storage compartment and at least one opening 704 in the hinge 110. The hinge 100 may have a height that measures between 0.8 in and 2.1 in. In various embodiments, the height of the hinge may be 1.10 in. More details of the connectors 112 and the hinge 110 are discussed in detail below in FIGS. 8-9.

Closed Configuration

Figure 2:
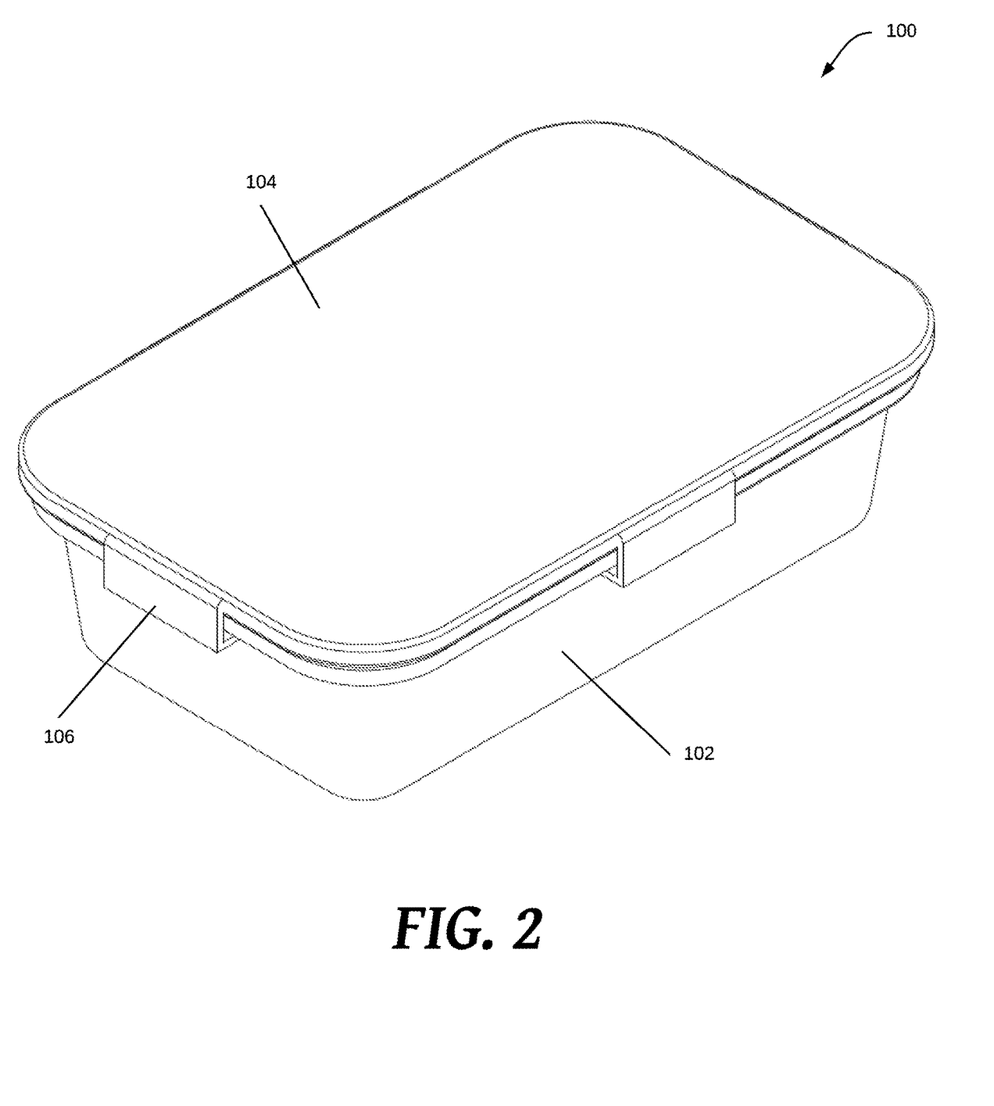
FIG. 2 is a perspective view of an exemplary food storage container in a closed configuration, according to embodiments of the disclosure.
Figure 3:
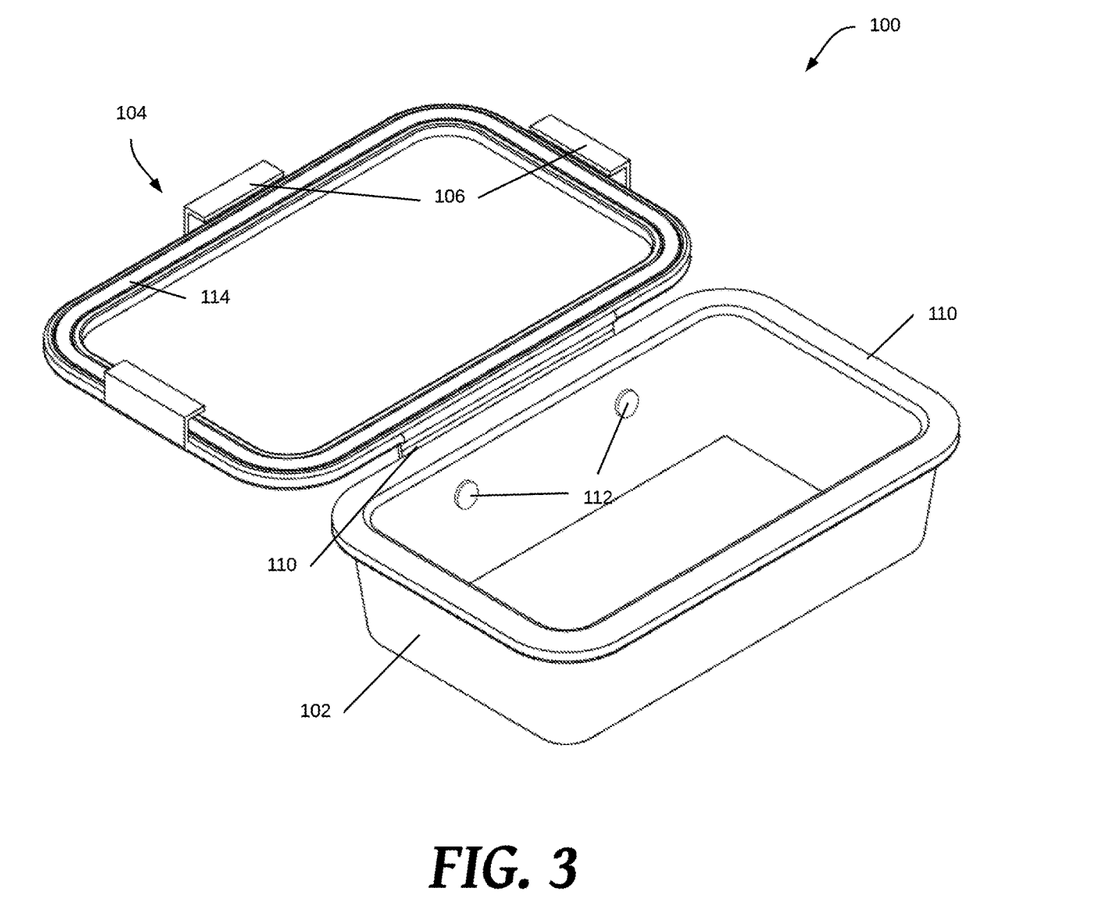
FIG. 3 is a perspective view of an exemplary food storage container in an open configuration, according to embodiments of the disclosure.
Figure 4:
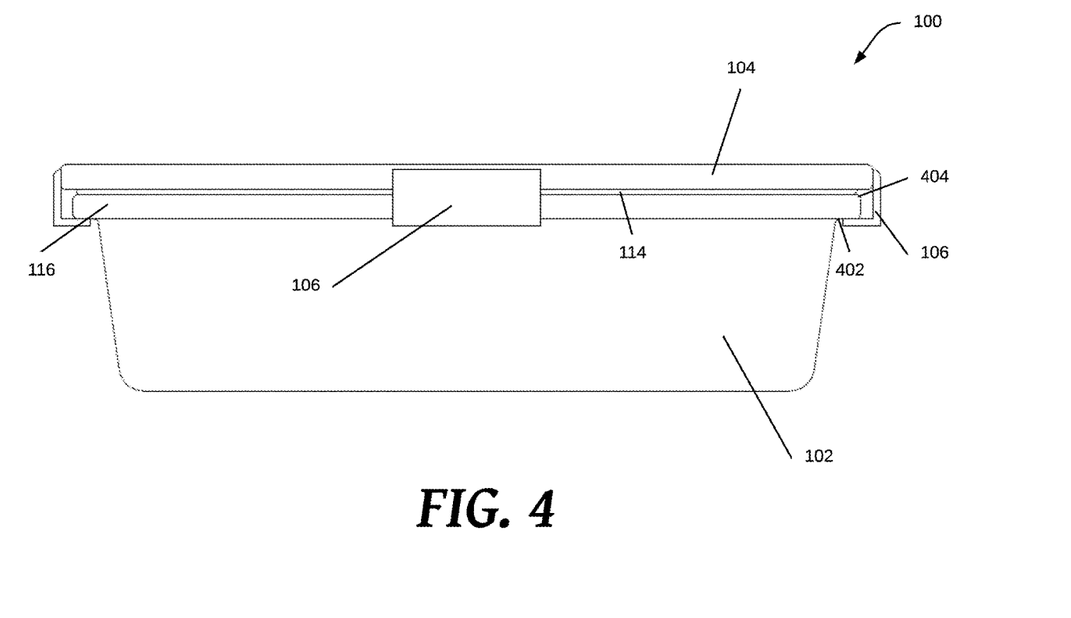
FIG. 4 is a front elevational view of an exemplary food storage container, according to embodiments of the disclosure.
Figure 5:
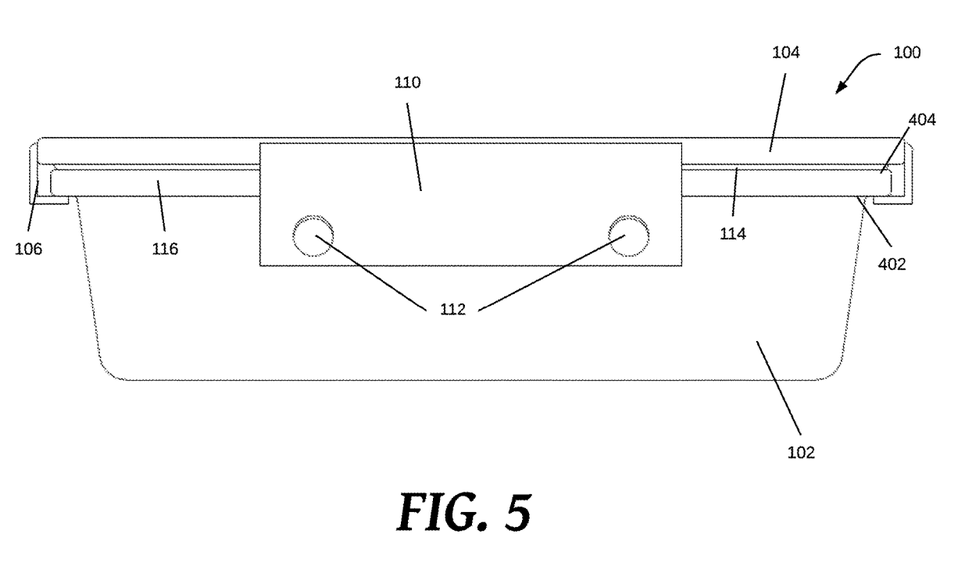
FIG. 5 is a back elevational view of an exemplary food storage container, according to embodiments of the disclosure.

FIGS. 2-5 illustrate alternate configurations of the food container 100. In particular, FIGS. 2 and 4-5 illustrate the food container 100 in a closed configuration with the lid 104 in a locked position secured on top of the storage compartment 102. In the locked position, the locking elements 106 are locked in place covering the rim 116 and compressed against the surface area 402 on the bottom side of the rim 116. In the locked position, the ring 114 is also pressed against the top side 404 of the rim 116 to seal the inside of the storage compartment 102 from air and moisture. FIG. 2 illustrates a three dimensional perspective view of the food container 100 in the locked position. FIG. 4 illustrates a front elevational view of the food container 100 in the locked position and FIG. 5 illustrates a rear elevational view of the food container 100 in the locked position. As shown in FIG. 5, the connectors 112 to be threaded through the hinge 110 to secure the lid 104 to the storage compartment 102. To keep the connectors 112 in place, the connectors 112 may be fixed inside the holes and or the openings in the hinge 110 using an adhesive. Once threaded inside the holes, the connectors 112 may also be fused to the storage compartment holes and or hinge 110 openings.

Configuring the food container 100 in the closed configuration enables solid food and liquids to be securely stored inside the food container 100. Locking the locking elements 106 in a locked position causes the ring 114 to seal in the inside of the food container 100 allowing food to be stored for several days or weeks.

Open Configuration

FIG. 3 illustrates a three dimensional perspective view of the food container 100 in an open configuration. As shown, the lid 104 may be attached to the storage compartment 102 when the food container 100 is in an open configuration to ensure the lid 104 is never separated from the storage compartment 102 and that all pieces of the food container 100 remain together. In the open configuration, the locking elements 106 may be in an unlocked position in which the locking elements are open and removed from the rim 116. The hinge 110 may also be flexed to allow the lid 104 to be removed from the rim 116 and open the top side of the storage compartment 102. Configuring the food container 100 in the open configuration enables solid foods and liquids to be removed from the storage compartment 102. When in an open configuration, the food container 100 may be used as a cooking dish to cook food or a serving dish to extract portions of food for consumption. The open configuration also allows the food container 100 to be cleaned to remove any excess food or liquid residue from the inside of the lid 104 and or storage compartment 102. The food container 100 may also be stored in the open configuration to allow multiple food containers to be stacked on top on each other. The sloped side walls of the storage compartment 102 facilitate stacking by allowing the base portion of a top food storage container to be inserted into the top side of a bottom food storage container.

Connectors and Hinge

Figure 6:
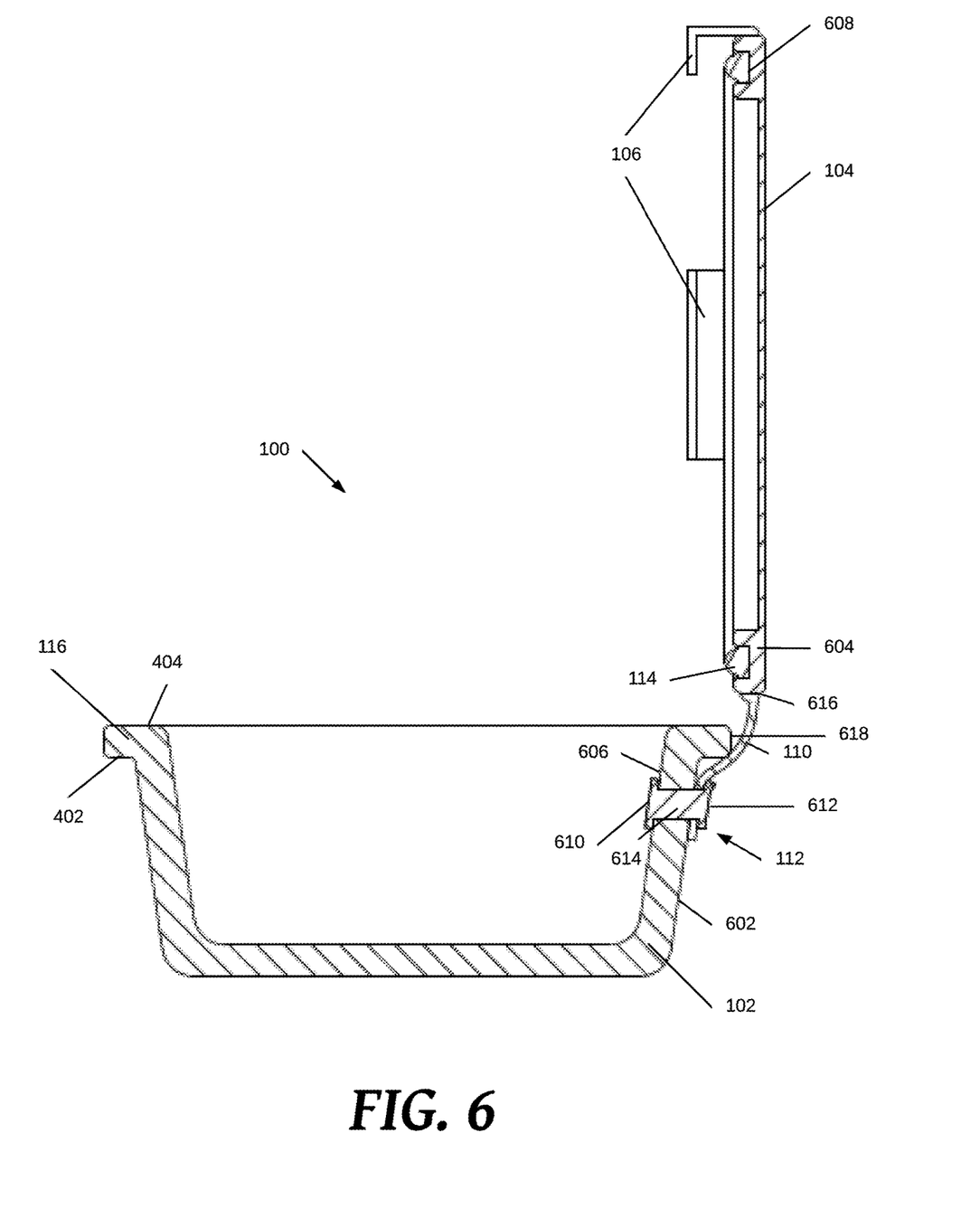
FIG. 6 is a cross sectional view of an exemplary food storage container, according to embodiments of the disclosure.
Figure 8:
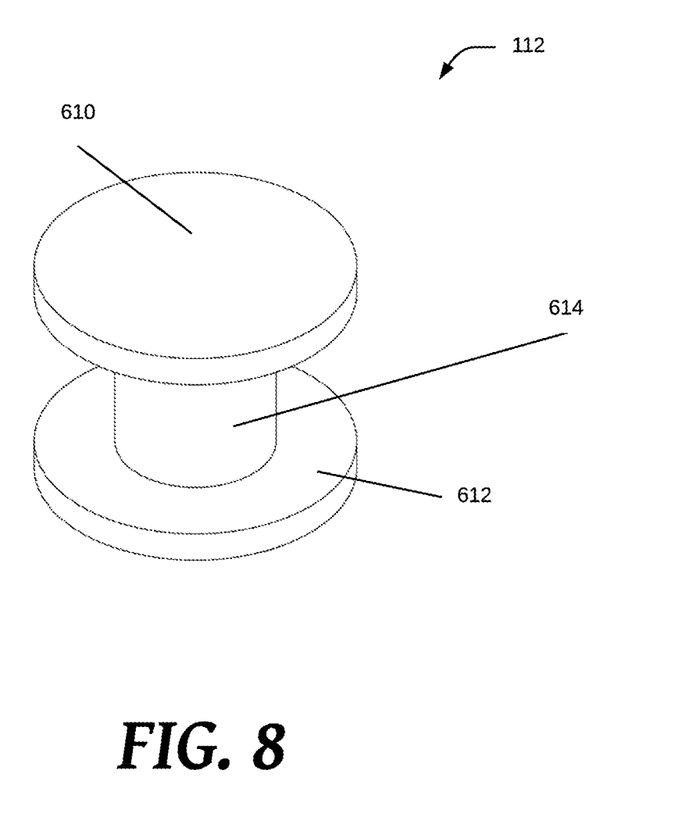
FIG. 8 illustrates an exemplary connector that is assembled, according to embodiments of the disclosure.
Figure 9:
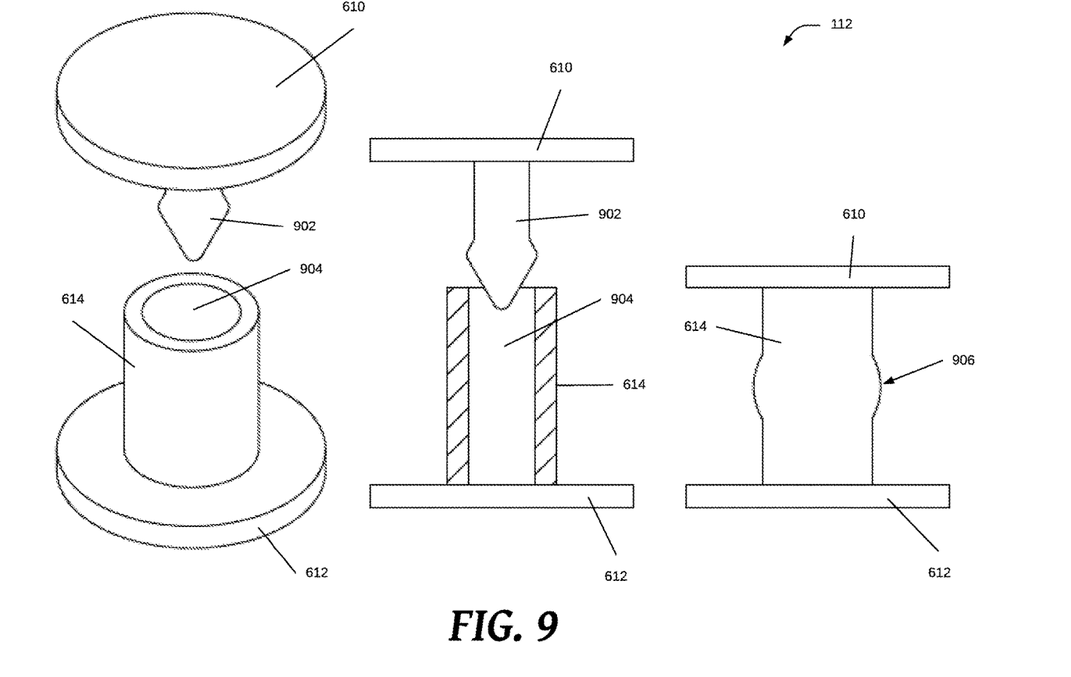
FIG. 9 illustrates different perspectives of an exemplary connector that is disassembled, according to embodiments of the disclosure.

FIGS. 6 and 8-9 illustrate more details of the connector 112 and hinge 110. FIG. 6 illustrates a cross sectional view of the food container 100. As shown, the food container 100 may have the lid 104 attached to the storage compartment 102. The lid 104 may be attached to the storage compartment 102 using one or more connectors 112 and a hinge 110. FIGS. 8-9 illustrate more details of the connectors 112. As shown in FIG. 8, the connectors 112 may be formed from a flexible material having an hour glass shape and an "I" shaped cross section. The connectors may include two circular heads (i.e., a first head 610 and a second head 612) joined by a middle portion 614. Each head may have a greater surface area, circumference, and or perimeter, relative to the middle portion 614 of the connectors 112. The middle portion 614 may be a cylindrical shaft. For example, the middle portion 614 may have a diameter between 0.25 in and 0.5 in so that the circumference of the middle portion 614 may be between 0.785 in 1.58 in. In various embodiments, the diameter of the middle portion 614 may be 0.375 in and the circumference of the middle portion may be 1.178 in. Each head may have a diameter that measures between 0.5 in and 1.0 in and each head may have a circumference that measures between 1.57 in and 3.14 in. In various embodiments, the diameter of each head may be 0.75 in and the circumference of each head may be 2.36 in.

To connect the hinge 110 and storage compartment 102, a first head 610 may be threaded through the hole in the side wall of the storage compartment 102 to connect the connectors 112 to the storage compartment 102. A second head 612 may be threaded through the opening in the hinge 110 to connect the connectors to the hinge 110. The first head 610 and the second head 612 may be joined by the middle portion 614. The middle portion 614 may have a length that matches a combined width of the side wall of the storage compartment 102 and the hinge 110 exactly so that the first head 610 of the connector 112 fits tightly against an interior side wall surface 606 of the storage compartment 102 and the second head 612 compresses the hinge 110 tightly against an exterior side wall surface 602 of the storage compartment 102.

FIG. 9 illustrates a double cap press rivet configuration of the connector 112. As shown in the figure, the first head 610 may have a rivet portion 902 that extends down from the cap portion at the top of the first head 610. The rivet portion 902 may be inserted into a cavity 904 included in center of the middle portion 614 of the connector 112 between the two heads. The width of the rivet portion 902 may be greater than the width of the cavity 904 so that the rivet portion 902 expands the width of the middle portion 614 to create a bulge 906 when inserted into the middle portion 614. The width of the rivet portion 902 secures the first head 610 inside the soft flexible middle portion 614 to allow the connector 112 to maintain its hourglass shape and "I" cross section when assembled. The soft flexible material of the middle portion 614 also enables the middle portion 614 to compress around the rivet portion 902 to create the bulge 906 when the connector 112 is assembled. The compression force of the middle portion 614 against the rivet portion 902 however may be overcome to pull the rivet portion 902 out of the cavity 904 and disassemble the connector 112. Accordingly, the double cap press rivet configuration enables the connector 112 to be assembled and dissembled by hand.

The double cap press rivet configuration may increase the speed in which the lid can be attached and detached from the storage compartment by enabling the thinner portions of the connector 112 to be threaded through the openings in the hinge and holes in the storage compartment instead of the wider first 610 and second heads 612. For example, to assemble the food storage container, the middle portion 614 may be threaded through the hole in the storage compartment so that the cavity 904 faces away from the center of the storage compartment and the inner surface of the second head 612 is flush against the inner surface of the side portion of the storage compartment. The rivet portion 902 may then be threaded through the opening in the hinge so that the rivet portion 902 extends forward through the opening and the inner surface of the first head 610 is flush against the back surface of the hinge. The rivet portion 902, while threaded through the hinge, may then be inserted into the cavity 904 while the middle portion 614 is threaded through the side portion of the storage compartment until the rivet portion 902 is secured inside the cavity 904 and the sides of the middle portion 614 expand to create the bulge 906. The lid may then be removed from the storage compartment by removing the rivet portion 902 from the cavity 904. Accordingly, the lid may be removed from the storage compartment without having to thread either of the first 610 or second heads 612 through the hole in the storage compartment or the openings in the hinge.

As shown in FIGS. 5-6, the hinge 110 and the lid 104 may be manufactured as one part and may be formed form the same material. Alternatively, the lid 104 may be attached to the hinge 110. For example the hinge 110 may be fused or otherwise attached to the lid 104 at an attachment surface 616. The attachment surface 616 may be at a bottom side of the lid 104. The hinge 110 may be flexed to remove the lid 104 from the storage compartment 102. The length of the hinge 110 may measure between 1 in and 2.5 in so that the length of the hinge 110 is equivalent to approximately 1.5 times the distance between the holes in the storage compartment 102 and the top of the lid 104. The dimensions of the hinge 110 allow the hinge 110 to easily reach over the top of the rim 116 around the perimeter of the storage compartment 102 without stretching and without excess slack. When the lid 104 is sealed around the rim 116, the hinge 110 may be tight but not strained or stretched.

The hinge 110 may be an elastomeric material that allows the lid 104 to rotate up to 180° from the closed configuration shown in FIG. 2 to the open configuration shown in FIG. 3. The hinge 110 may be compressed to allow the lid 104 to be rotated over the top side of the storage compartment 102 to the closed configuration when the lid 104 is attached to the storage compartment 102. When the food container 100 is in the closed configuration and the compressed hinge 110 may be folded against a side surface 618 of the rim 116 along the rear side of the food container to ensure the lid 104 can fully cover the rim 116 when attached to the storage compartment 102. The arrangement of the hinge 110 against the side surface 618 and elastomeric material of the hinge 110 allows food container 100 to be converted from the open configuration to the closed configuration and vice versa without separating the lid 104 from the storage compartment 102 and or requiring excess material for the hinge 110. Increasing the amount of material required for the hinge 110 may make storing the food container 100 more difficult and may detract from the appearance of the food container 100 making it less desirable than other food containers.

Grooves and Ring

As shown in FIG. 6, the lid 104 may include an edge 604 having a groove 608 cut into the center of the edge 604. The groove 608 may receive a ring 114 that is inserted into the groove 608. The ring 114 may extend out from the groove 608 to a distance that is greater than the width of the edge 604. The portion of the ring that extends beyond the edge 604 of the lid 104 may be compressed against the rim 116 to from a seal when the food container 100 is in a closed configuration. The perimeter of the groove 608 have straight edges as shown to receive a ring 114 having a rectangular cross section. The perimeter of the groove 608 may also have one or more curved edges to receive a ring 114 having a circular cross section. The cross section of the ring 114 and shape of the perimeter of the groove may be manipulated to provide a seal that may be particular to a particular type of food, storage condition, and or shape of the food container 100. For example, a curved groove 608 and ring 114 having a circular cross section may be used to provide a strong seal for food containers 100 having a circular shape. A straight edged groove 608 and ring 114 having a rectangular cross section may be used to provide a strong seal for food containers 100 having a rectangular shape. The strength of the seal may be sufficient to form an airtight and or water tight seal that secures food stored inside the storage compartment. The force of the seal generated by the locking elements may be similar to other food storage containers and not be more than a young child is capable of generating so that the food storage container may be used by a wide variety of people to store food.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:
1. A food container comprising:
 a storage compartment including a base portion and one or more side portions that extend from the base portion to a rim that runs along a perimeter of a top side of the storage compartment;

a lid that fits over the top side of the storage area, the lid including a plurality of locking elements that are moveable relative to the lid, the locking elements configured to secure the lid to the storage compartment; and a hinge connected to the lid and fixed to the storage compartment by one or more connectors, the hinge formed from a durable, flexible material and configured to join the lid to the storage compartment and allow a bottom side of the lid to fold over the top side of the storage compartment, and wherein the one or more connectors include at least a first head and a second head, wherein a rivet portion of the first head configured to be disposed inside a cavity of the second head, with a width of the cavity where the rivet portion is disposed is greater than a width of a middle portion of the cavity.

2. The food container of claim 1, wherein the storage area is formed from a durable, non-toxic borosilicate glass material.

3. The food container of claim 1, wherein the locking elements include an "L shaped" piece of material that extends down from an exterior edge of the lid toward an interior side of the lid.

4. The food container of claim 3, wherein the "L shaped" piece of material is hinged at an attachment point that joins the locking elements to the lid, wherein the locking elements pivot at the attachment point to arrange the food container in a locked position and in an unlocked position.

5. The food container of claim 4, wherein the "L shaped" piece of material includes a horizontal rectangle that runs parallel to the interior side of the lid and a vertical rectangle that runs perpendicular to the interior side of the lid.

6. The food container of claim 5, wherein the locked position includes the "L shaped" piece of material wrapped around the rim of the storage container and a horizontal rectangle of the "L shaped" piece of material is pushed into contact with a surface area on a bottom side of the rim.

7. The food container of claim 5, wherein the unlocked position includes the "L shaped" piece of material lifted away from the rim of the storage container with the horizontal rectangle of the "L shaped" piece of material positioned away from a surface area on a bottom side of the rim.

8. The food container of claim 1, wherein the side portion storage slopes outwardly along a side portion edge that extends from the base portion to the rim so that a perimeter of the rim is greater than a perimeter of the base portion.

9. The food container of claim 1, wherein an inner surface of the lid includes a groove along a perimeter of the inner surface.

10. The food container of claim 9, further comprising a ring that fits into the groove, wherein the ring is formed from an elastomeric material.

11. The food container of claim 10, wherein the ring is configured to compresses against the rim to form an airtight and moisture tight seal when the lid is closed over the top side of the storage compartment and the locking elements are arranged in a locked position.

12. The food container of claim 9, wherein the ring is removable from the groove and wherein the ring is formed from a durable silicone material.

13. The food container of claim 12, wherein the connectors include a flexible material having an hourglass shape, the hour glass shape including the first head joined by a middle portion to the second head, wherein the first and second heads have a greater circumference relative to the middle portion.

14. The food container of claim 13, wherein the first head of the connectors is inserted into a hole in the side portion of the storage compartment and the second head of the connectors is inserted into a hole in the hinge to connect the lid to storage compartment.

* * * * *